United States Patent
Minton (10) Patent No.: US 8,381,118 B2
(45) Date of Patent: Feb. 19, 2013

(54) METHODS AND DEVICES THAT RESIZE TOUCH SELECTION ZONES WHILE SELECTED ON A TOUCH SENSITIVE DISPLAY

(75) Inventor: Wayne Christopher Minton, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 452 days.

(21) Appl. No.: 12/573,552

(22) Filed: Oct. 5, 2009

(65) Prior Publication Data

US 2011/0083104 A1  Apr. 7, 2011

(51) Int. Cl.
*G06F 3/048* (2006.01)
*G06F 3/033* (2006.01)
*G06F 3/14* (2006.01)
*G06F 3/00* (2006.01)
*G06F 3/02* (2006.01)
*G06F 3/041* (2006.01)
*G06G 5/00* (2006.01)

(52) U.S. Cl. ........ 715/773; 715/778; 715/816; 715/825; 715/864; 715/866; 345/168; 345/169; 345/173

(58) Field of Classification Search .................. 345/168, 345/169, 173; 715/773, 778, 816, 825, 864, 715/866

See application file for complete search history.

(56) References Cited

U.S. PATENT DOCUMENTS

| | | | | |
|---|---|---|---|---|
| 2002/0191029 | A1* | 12/2002 | Gillespie et al. | 345/810 |
| 2005/0030291 | A1* | 2/2005 | Yanagisawa | 345/173 |
| 2006/0026535 | A1* | 2/2006 | Hotelling et al. | 715/863 |
| 2006/0161846 | A1* | 7/2006 | Van Leeuwen | 345/173 |
| 2007/0152980 | A1* | 7/2007 | Kocienda et al. | 345/173 |
| 2008/0305836 | A1 | 12/2008 | Kim et al. | |
| 2009/0231282 | A1* | 9/2009 | Fyke | 345/173 |
| 2009/0237362 | A1* | 9/2009 | Wu et al. | 345/173 |
| 2009/0251422 | A1* | 10/2009 | Wu et al. | 345/173 |
| 2009/0319935 | A1* | 12/2009 | Figura | 715/773 |
| 2010/0066695 | A1* | 3/2010 | Miyazaki | 345/173 |
| 2010/0251176 | A1* | 9/2010 | Fong et al. | 715/821 |

FOREIGN PATENT DOCUMENTS

DE  102 10 637 A1  10/2003
WO  WO 2009/098575 A2  8/2009

OTHER PUBLICATIONS

Notification of transmittal of the international search report and the written opinion of the international searching authority, or the declaration, PCT/IB2010/051477, Jun. 30, 2010.

* cited by examiner

*Primary Examiner* — Kieu Vu
*Assistant Examiner* — Eric J Bycer
(74) *Attorney, Agent, or Firm* — Myers Bigel Sibley & Sajovec, P.A.

(57) ABSTRACT

An electronic device includes a controller circuit that is configured to display selectable indicia on a touch sensitive display device. The controller defines a default size and location of a plurality of selection zones on the display device that are each associated with different ones of the displayed selectable indicia. The controller responds to a touch signal from the display device that identifies a first touch location of a user object by increasing the size of a first one of the selection zones that includes the first touch location. The controller responds to the touch signal identifying that the user object has ceased touching the display device at a second touch location, which is within the enlarged first selection zone but outside the default sized first selection zone, by outputting a first one of the selectable indicia that is associated with the first selection zone.

20 Claims, 6 Drawing Sheets

METHODS AND DEVICES THAT RESIZE TOUCH SELECTION ZONES WHILE SELECTED ON A TOUCH SENSITIVE DISPLAY

BACKGROUND

The present invention relates to electronic devices and, more particularly, to touch screen user interfaces for electronic devices and related methods and computer program products.

Many electronic devices, such as wireless communication terminals (e.g., cellular telephones), personal digital assistants (PDAs), palmtop computers, and the like, include monochrome and/or color display screens that may be used to display webpages, images and videos, among other things. Portable electronic devices may also include Internet browser software that is configured to access and display Internet content. Thus, these devices can have the ability to access a wide range of information content, including information content stored locally and/or information content accessible over a network such as the Internet.

As with conventional desktop and laptop computers, portable electronic devices have been provided with graphical user interfaces that allow users to manipulate programs and files using graphical objects, such as screen icons. Selection of graphical objects on a display screen of a portable electronic device can be cumbersome and difficult, however. Early devices with graphical user interfaces typically used directional keys and a selection key that allowed users to highlight and select a desired object. Such interfaces can be slow and cumbersome to use, as it may require several button presses to highlight and select a desired object.

More recent devices have employed touch sensitive screens that permit a user to select a desired object by pressing the location on the screen at which the object is displayed. However, such devices have certain drawbacks in practice. For example, while the spatial resolution of a touch screen can be relatively high, users typically want to interact with a touch screen by touching it with a fingertip. Thus, the size of a user's fingertip limits the actual available resolution of the touchscreen, which means that it can be difficult to manipulate small objects or icons on the screen, particularly for users with large hands. Furthermore, when using a touchscreen, the user's finger can undesirably block all or part of the display in the area being touched. System designers are faced with the task of designing interfaces that can be used by a large number of people, and thus may design interfaces with icons larger than necessary for most people. Better touch resolution can be obtained by using a stylus instead of a touch screen. However, users may not want to have to use a separate instrument, such as a stylus, to interact with their device.

SUMMARY

An electronic device according to some embodiments includes a controller circuit that is configured to display selectable indicia on a touch sensitive display device. The controller defines a default size and location of a plurality of selection zones on the display device that are each associated with different ones of the displayed selectable indicia. The controller responds to a touch signal from the display device that identifies a first touch location of a user object by increasing the size of a first one of the selection zones that includes the first touch location. The controller responds to the touch signal identifying that the user object has ceased touching the display device at a second touch location, which is within the enlarged first selection zone but outside the default sized first selection zone, by outputting a first one of the selectable indicia that is associated with the first selection zone.

In some further embodiments, the controller circuit responds to the touch signal identifying that the user object has ceased touching the display device by decreasing the size of the enlarged first selection zone back to the default size.

The controller circuit may be configured to respond to the touch signal identifying that the user object has slid from the first touch location to a third touch location, where the user object has then ceased touching the display device and where the third touch location is within a third selection zone that is outside of the first selection zone, by outputting a third one of the selectable indicia that is associated with the third selection zone and by decreasing the size of the enlarged first selection zone.

The controller circuit may be configured to respond to the touch signal identifying that the user object has slid from the first touch location to a third location that is outside the enlarged first selection zone by decreasing the size of the enlarged first selection zone and by increasing the size of a second one of the selection zones that includes the third location.

The controller circuit may be configured to respond to the touch signal identifying that the first touch location of the first selection zone is being touched by decreasing the size of a second selection zone that is adjacent to the first selection zone so that the enlarged first selection zone does not overlap the second selection zone having the decreased size.

The first and second selection zones may be defined by the controller circuit to have the same default size when the touch signal does not indicate that a location within either of the first and second selection zones is being touched.

The controller circuit may be configured to respond to the touch signal identifying that the first touch location is being touched by decreasing the size of all selection zones that are immediately adjacent to the first selection zone so that the enlarged first selection zone does not overlap any of the immediately adjacent selection zones having the decreased sizes.

The controller circuit may be configured to respond to the touch signal identifying that another touch location is being touched that is within the decreased size second selection zone by increasing the size of the second selection zone and decreasing the size of the first selection zone so that enlarged second selection zone does not overlap the first selection zone having the decreased size.

The controller circuit may be configured to respond to the touch signal identifying that the first touch location of the first selection zone is being touched by disabling a second selection zone that is adjacent to the first selection zone so that the enlarged first selection zone at least partially overlaps the disabled second selection zone.

The controller circuit may be configured to respond to the touch signal identifying that the first touch location is being touched by disabling all selection zones that are immediately adjacent to the first selection zone so that the enlarged first selection zone at least partially overlaps the disabled immediately adjacent selection zones.

The controller circuit may be configured to respond to the touch signal identifying that another touch location is being touched that is within the disabled second selection zone by increasing the size of the second selection zone, by enabling the second selection zone, by decreasing the size of the first selection zone, and by disabling the first selection zone so that the enlarged second selection zone at least partially overlaps the disabled first selection zone having the decreased size.

The controller circuit may be configured to display a numeric keypad with spaced apart indicia for each of the integer numbers from 0 to 9, to associate ten selection zones each with a different one of the displayed numbers, and to respond to the touch signal identifying that the first touch location within the first selection zone that is associated with the displayed number 5 by enlarging the size of the first selection zone and by decreasing the size of an adjacent second selection zone that is associated with one of the displayed numbers 2, 4, 6, and 8.

The controller circuit may be configured to respond to the touch signal identifying that the user object has slid from the first touch location to the second touch location, where the user object has then ceased touching the display device, by outputting an indication of the user's selection of the number 5.

The controller circuit may be configured to respond to the touch signal identifying that the user object has slid from the first touch location to a third touch location, where the user object then ceased touching the display device and where the third touch location is within a third selection zone that is outside of the first selection zone and that is associated with the displayed number 4, by outputting an indication of the user's selection of the number 4 and by decreasing the size of the enlarged first selection zone associated with the displayed number 5.

The controller circuit may be configured to display a qwerty alphabetic keyboard with spaced apart indicia for each letter of the keyboard, to associate selection zones each with a different one of the displayed letters, and to respond to the touch signal from the display device identifying that the user object has touched the first touch location within the first selection zone for a first one of the letters by enlarging the first selection zone and by decreasing the size of the selection zone associated with at least one of the displayed letters that is immediately adjacent to the first one of the letters, and to respond to the touch signal identifying that the user object has ceased touching the display device at the second touch location, which is within the enlarged first selection zone, by outputting the first letter.

The controller circuit may be configured to respond to the touch signal identifying that the user object has slid from the first touch location to the third touch location, where the user object then ceased touching the display device and where the third touch location is within the third selection zone that is outside of the first selection zone and that is associated with a second one of the letters, by outputting an indication of the user's selection of the second letter and by decreasing the size of the enlarged first selection zone associated with the first letter.

The controller circuit may respond to the touch signal identifying that the first touch location of the first selection zone is being touched by changing the shape of adjacent selection zones so that the enlarged first selection zone does not overlap the adjacent selection zones having the changed shape.

The controller circuit may respond to the touch signal identifying that the first touch location of the first selection zone is being touched by moving locations of the adjacent selection zones on the display device so that the enlarged first selection zone does not overlap the relocated adjacent selection zones.

An electronic device according to some other embodiments includes a touch-sensitive display device and a controller circuit. The touch-sensitive display device is configured to generate a touch signal that identifies a touch location of a user object on a screen of the display device. The controller circuit is configured to display selectable indicia on the display device, configured to define a default size and location of a plurality of selection zones on the display device that are each associated with different ones of the displayed selectable indicia, and configured to respond to a touch signal from the display device that identifies a first touch location of a user object by increasing the size of a first one of the selection zones that includes the first touch location. The controller circuit is further configured to respond to the touch signal identifying that the user object has ceased touching the display device at a second touch location, which is within the enlarged first selection zone but outside the default sized first selection zone, by outputting a first one of the selectable indicia that is associated with the first selection zone. The controller circuit is further configured to respond to the touch signal identifying that the user object has slid from the first touch location to a third location that is outside the enlarged first selection zone by decreasing the size of the enlarged first selection zone and by increasing the size of a second one of the selection zones that includes the third location, and to respond to the touch signal identifying that the user object has then ceased touching the display device at the third touch location by outputting a third one of the selectable indicia that is associated with the third selection zone and by decreasing the size of the enlarged first selection zone.

The tour circuit may be further configured to respond to the touch signal identifying that the first touch location is being touched by decreasing the size of all selection zones that are immediately adjacent to the first selection zone so that the enlarged first selection zone does not overlap any of the immediately adjacent selection zones having the decreased sizes.

Other devices, methods, and/or computer program products according to embodiments of the invention will be or become apparent to one with skill in the art upon review of the following drawings and detailed description. It is intended that all such additional devices, methods, and/or computer program products be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS OF THE INVENTION

The present invention now will be described more fully with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the term "comprising" or "comprises" is open-ended, and includes one or more stated features, integers, elements, steps, components or functions but does not preclude the presence or addition of one or more other features, integers, elements, steps, components, functions or groups thereof. As used herein, the term "and/or" includes any and all combinations of one or more of the associated listed items. Furthermore, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this disclosure and the relevant art and will not be interpreted in an idealized or overly formal sense unless expressly so defined herein.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Furthermore, "coupled" or "connected" as used herein may include wirelessly coupled or connected.

As used herein, a controller circuit references to any analog circuit and/or digital circuit that is configured to carry out the functionality that is described therewith.

Some electronic devices display virtual buttons on a touch sensitive display device which a user can select using a finger or other object, such as a stylus, that is manipulated by the user. When pressing a virtual button on the touch display, an action is triggered when the finger presses and then releases over the same active selection zone. As used herein, a selection zone (or hit zone) is a physical area on the display that can be touched by a user to trigger a response from the electronic device.

When the selection zones are arranged adjacent to one another, such as to form a virtual keypad and/or keyboard, on a relatively small display device, the electronic device can erroneously detect the press of one selection zone and the release of another. This may be due, for example, to small movement that may occur with a user's finger or other object while it is contacting the display device, so that it is no longer over the pressed selection zone when it ceases to touch the display device. Some electronic devices identify which virtual key was selected in response to what selection zone was last being touched before the user object was removed. Although it may be desirable to make the selection zones sufficiently large so that a finger can be accurately positioned and released from a desired selection zone, this may not be possible due to design constraints for the available size and touch resolution of the display device.

Figure 1:
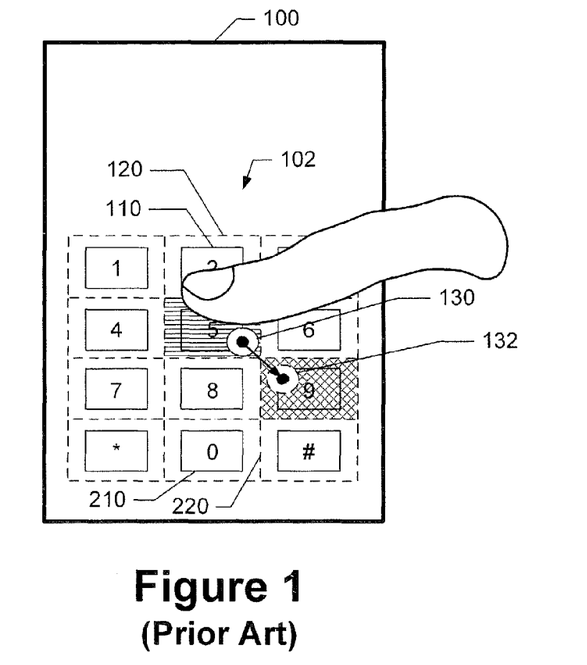
FIG. 1 illustrates a keypad that is displayed on a touch sensitive display with each key having a fixed size selection zone according to the prior art.

An example of such miss-selection due to small movements of a user's finger is shown in FIG. 1, which illustrates a keypad 102 that is displayed on a touch sensitive display 100 with each key 110 having a fixed size selection zone 120 according to the prior art. Referring to FIG. 1, a user's finger initially touches the number "5" key at location 130 but then slides a small distance to location 132, such as due to physical translation/rotation of the finger and/or insufficient touch resolution along edge portions of the touch zone. At location 132, the user's finger has exited the selection zone surrounding the number "5" key and has entered another selection zone surrounding the number "9". Accordingly, when the user's finger is removed from the display device 100, the display device 100 outputs an erroneous indication that the user selected the number "9" instead of the desired selected number "5".

Some embodiments of the present invention may arise from the present realization that the electronic device can be configured to temporarily increase the size of a selection zone in response to a user touching that selection zone. The enlarged selection zone may thereby overlap the default locations of adjacent selection zones, which may be disabled, reduced in size (e.g., reshaped), and/or moved to avoid such overlap. Increasing the size of the selection zone in response to the user's touch can allow the user to slightly move the finger/object within the region of the enlarged selection zone without such movement being misinterpreted by the device as the user desiring to select one of the adjacent selection zones instead of the originally selected zone.

Figure 2:
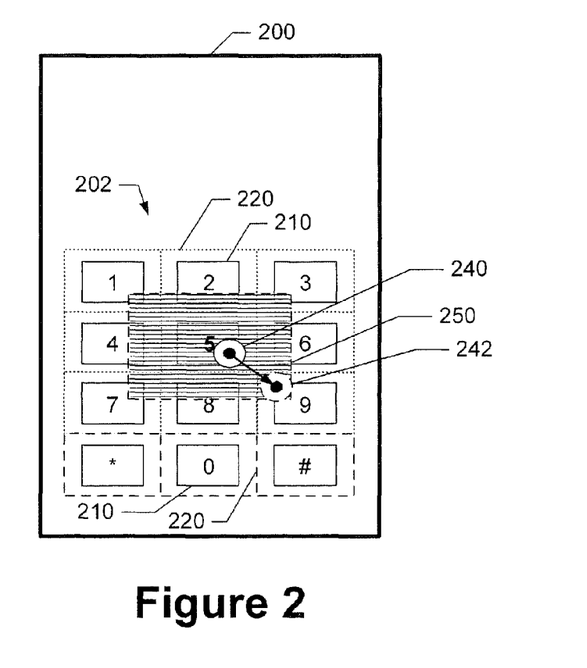
FIG. 2 illustrates an exemplary keypad that is displayed on a touch sensitive display with each key having a selection zone that is temporarily enlarged and the selection zones of the adjacent numeric keys are reduced/disabled in response to detection of a user's touch point within the selection zone of the selected key (e.g., numeric "5" key) in accordance with some embodiments of the present invention.

FIG. 2 illustrates an exemplary touch sensitive display device 200 that is configured by a controller circuit to display a keypad 202 with associated selection zones that have sizes which are controlled in response to touching in accordance with some embodiments of the present invention. Referring to FIG. 2, the controller circuit displays the numeric keypad with spaced apart virtual keys 210 displayed as boxes having conventional indicia for each of the integer numbers from 0 to 9 and symbols "*" and "#". The controller circuit also defines and associates different selections zones 220 with each of the virtual keys 210, where each of the selection zones 220 is defined by coordinate locations on the display 200 that encloses one of the virtual keys 210. Outlines of the selection zones 220 may be displayed on the display device 200 or they may not be displayed, such as indicated by the dashed lines in FIG. 2.

Figure 9:
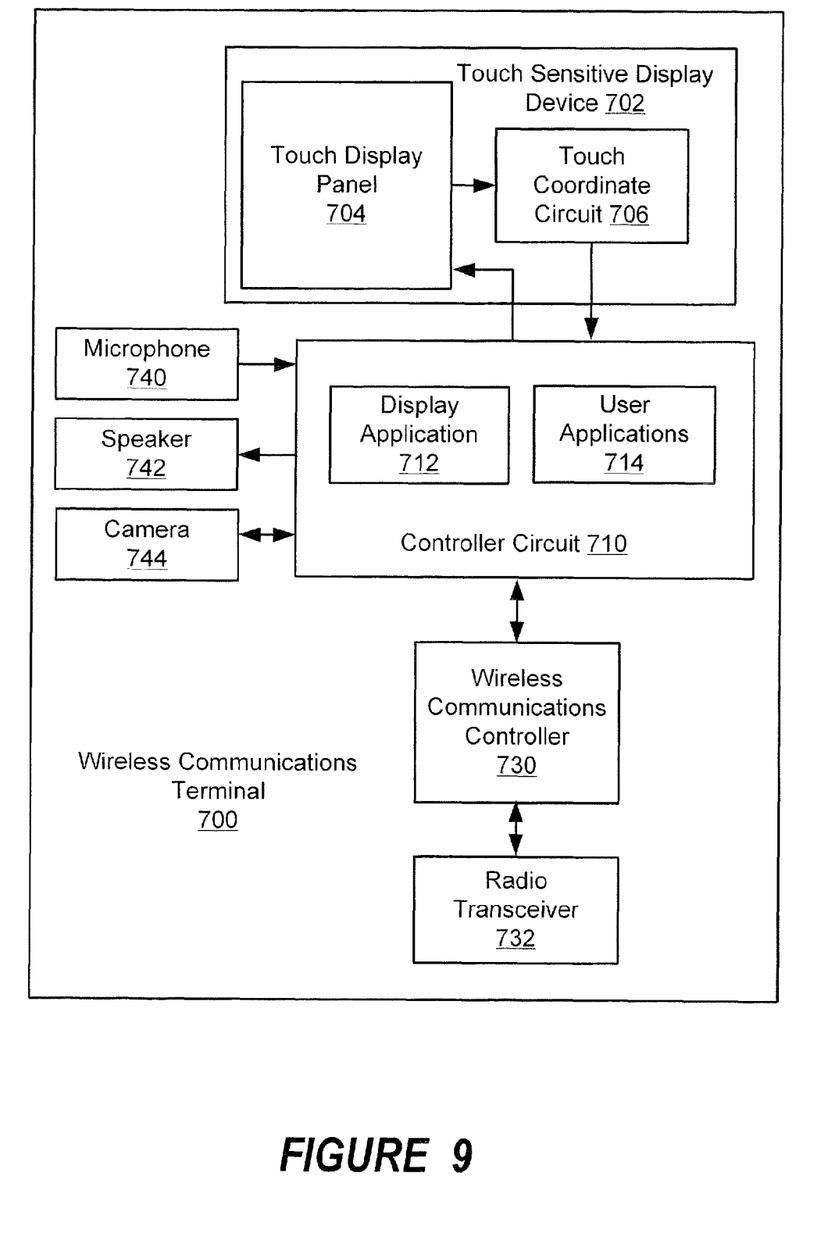
FIG. 9 is a block diagram of a wireless communication terminal that includes a touch screen that is configured according to some embodiments of the present invention.

An exemplary controller circuit 710 is shown in FIG. 9 that may be configured to carry out the operations explained herein with regard to one or more of FIGS. 2-7. As will be described in further detail below with regard to FIG. 9, the controller circuit 710 may respond to a touch signal that is generated by the display device 200 which identifies a location (e.g., coordinate locations) where a user is touching the display device 200.

In response to a user touching one of the virtual keys 210, the controller circuit enlarges the associated selection zone and decreases the size of and/or disables one or more of the adjacent selection zones. Exemplary operations are shown in FIG. 2, where the controller circuit responds to a touch signal identifying that a first touch location 240 within a selection zone 250 that associated with the displayed number "5" by enlarging the size of the selection zone 250 and by decreasing the size of adjacent selection zones 220 that are associated with one or more of the displayed numbers "2", "4", "6", and "8".

The controller circuit responds to the touch signal identifying that the user object has slid from the first touch location 240 to a second touch location 242, where the user object has then ceased touching the display device 200 (e.g., has been lifted away from the display), by outputting an indication of the user's selection of the number "5". It is noted that the user's finger initially touched at location 240 which is within the selection zone of the number "5" and then slid to the other location 242 that is outside the default selection zone of the number "5" and is within the default selection zone of the number "9". However, because location 242 is within the enlarged selection zone 250, the controller circuit outputs an indication of the user's selection of the number "5" instead of outputting an erroneous indication of the user's selection of the number "9". The controller circuit may output the user's selection to another application, such as a user application, that is executed by the controller circuit and/or it may be output to another circuit that is coupled to the display device 100 (e.g., through a wired and/or wireless communication connection).

In some embodiments, the selection zones 220 associated with all of the displayed numbers "2", "4", "6", and "8" are decreased in size and/or reshaped so that they are not overlapped by the enlarged selection zone 250. In some other embodiments, the selection zones 220 associated with all of the displayed numbers 2", "4", "6", and "8" are disabled to prevent an erroneous triggering of those zones when a user's finger is within the enlarged selection zone 250 and overlaps one or more of the disabled selection zones 220.

The controller circuit can be configured to respond to the touch signal identifying that the user object has ceased touching the display device 200 by decreasing the size of any presently enlarged selection zone back to the default size. For example, after the user stops touching the display device 200 at location 242, the controller circuit responds by decreasing the size of the enlarged selection zone 250 back to its default size prior to the user touching the display 200 at location 240. In some embodiments, some or all of the selection zones may have the same default size.

When the touch signal from the display device 100 indicates that the location of the user's touch has slid outside of the enlarged selection zone and into the area of another selection zone, the controller circuit responds thereto by decreasing the size of the enlarge selection zone and increasing the size of the other selection zone. For example, FIG. 3 illustrates the keypad 202 of FIG. 2 in which the selection zone 250 associated with the displayed "5" key remains enlarged until the present touch point is determined to have moved to a location 244 that is outside the enlarged selection zone 250 associated with the displayed "5" key.

Figure 3:
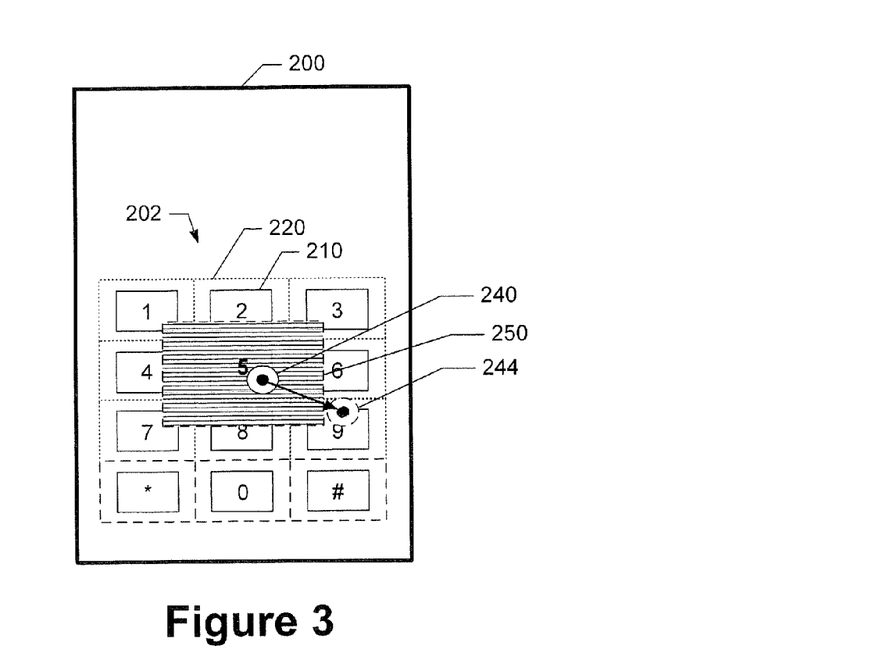
FIG. 3 illustrates the keypad of FIG. 2 in which the selection zone for the numeric "5" key remains enlarged until the user's touch point is determined to have moved outside the enlarged selection zone for the "5" key.
Figure 4:
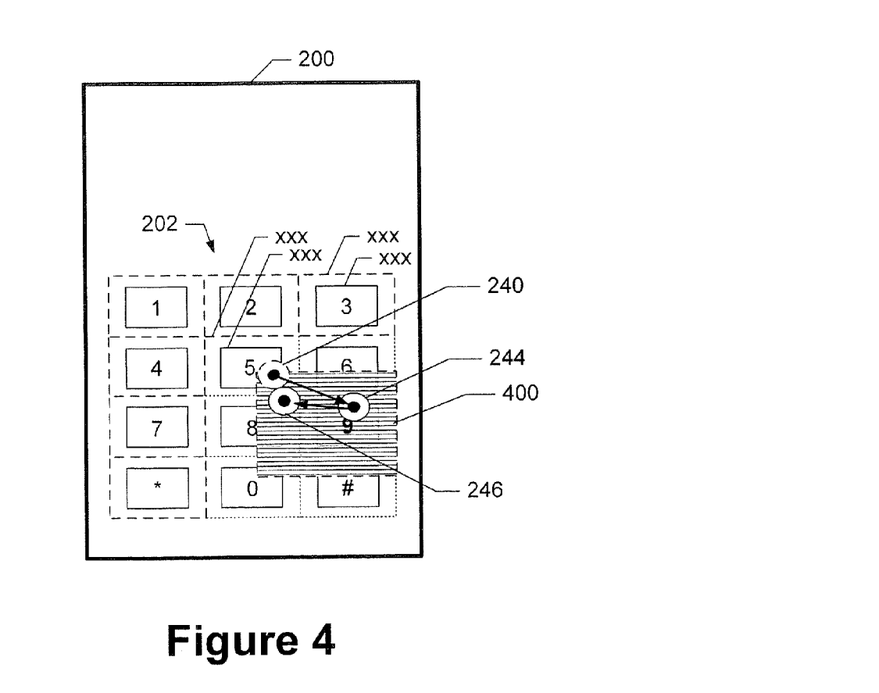
FIG. 4 illustrates the keypad of FIG. 3 following the determination that the user touch point has moved outside the enlarged selection zone for the "5" key into the present selection zone of the "9" key, which causes the selection zone for the numeric "5" key to be reduced in size and the selection zone for the numeric "9" key to been enlarged in accordance with some embodiments of the present invention.

FIG. 4 illustrates the keypad 202 of FIG. 3 following the determination that the present touch point has moved to the location 244 outside the enlarged selection zone 250 for the displayed "5" key into the area of another selection zone 400 that is associated with the displayed "9" key. The controller circuit responds thereto by decreasing the size of the enlarged selection zone 250 and increasing the size of the selection zone 400 for the displayed "9" key. The controller circuit may sufficiently decrease the size of the selection zone 250 so that it is not overlapped by the enlarged selection zone 400 to prevent an erroneous triggering of selection zone 250 when the user's finger is removed from the display device 200 at a location that is within the enlarged selection zone 400 and which overlaps the former enlarged selection zone 250. The controller circuit may alternatively or additionally disable the selection zone of the displayed "5" key when it enlarges the selection zone 400 and it may enable the selection zone 400 for the displayed "9" key when it enlarges that zone, so that if the user stops touching the display device 100 from a location anywhere within the enlarged selection zone 400 the controller circuit outputs an indication of the user's selection of the number "9" instead of an erroneous indication of selection of one of the other adjacent displayed numbers.

If the touch signal indicates that the user has ceased touching the display device 200 at the location 244 or at another location within the area defined for the enlarged selection zone 400, the controller circuit responds thereto by outputting an indication of the user's selection of the number "9". For example, when the touch signal indicates that the user's touch location has slid from location 244 to location 246, which is within the presently enlarged selection zone 400, and then released from the display device 200, the controller circuit outputs an indication of the user's selection of the number "9". It is noted that the location 246 is within the previously enlarged selection zone 250 for the displayed "5" key but does not trigger output of the user's selection of the number "5" because the selection zone 250 has been reduced in size so that it is not overlapped by the enlarged selection zone 400 and/or it has been disabled.

Figure 5:
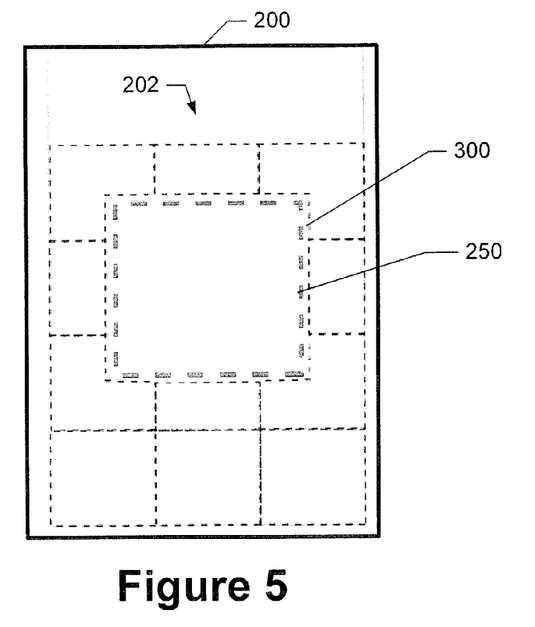
FIG. 5 illustrates the keypad of FIG. 2 in which the selection zones for the adjacent numeric keys are reduced in size by reshaping their outlines in response to detection of a user's touch point within the selection zone of the selected key (e.g., numeric "5" key) in accordance with some embodiments of the present invention.

As explained above, to avoid overlap between an enlarged selection zone (responsive to user selection) and adjacent selection zones, the adjacent selection zones may be resized by changing their outline shape. FIG. 5 illustrates the keypad 202 of FIG. 2 in which the selection zone 250 of a selected key (e.g., numeric "5" key) has been enlarged. To avoid overlap between the enlarged selection zone 250 and the adjacent selection zones 300, the outline shape of each of the adjacent selection zones 300 has been modified. Thus, for example, as shown in FIG. 5, the adjacent selection zones 300 no longer have a square/rectangular shape but, instead, have each lost corner regions in order to avoid overlapping their surface areas with the enlarged selection zone 250. When the selection zone 250 is returned back to its default size (responsive to user deselection thereof), the adjacent selection zones 300 can also be returned to their default shapes.

Figure 6:
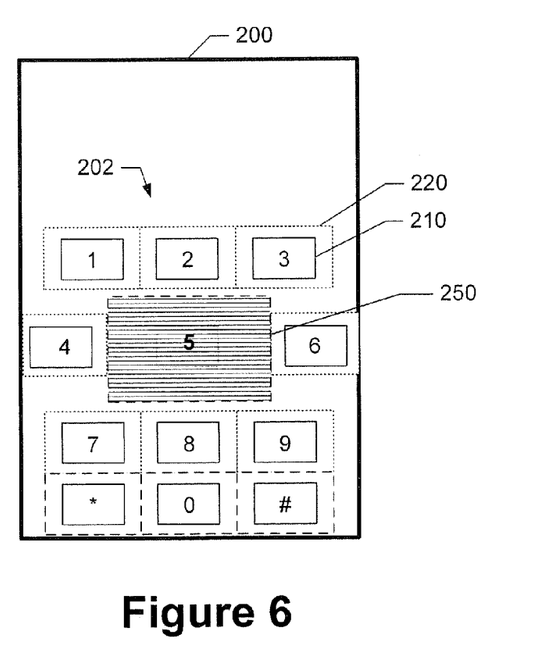
FIG. 6 illustrates the keypad of FIG. 2 in which the selection zones for the adjacent numeric keys are moved in response to detection of a user's touch point within the selection zone of the selected key (e.g., numeric "5" key) in accordance with some embodiments of the present invention.

As was also explained above, overlap between an enlarged selection zone and adjacent selection zones may additionally or alternatively be avoided by moving the adjacent selection zones. FIG. 6 illustrates the keypad 202 of FIG. 2 in which the selection zones 220 for the adjacent numeric keys 210 are moved to avoid overlap with the enlarged selection zone 250 (responsive to user selection of the numeric "5" key). Thus, for example, as shown in FIG. 6, the selection zones 220 for the adjacent numeric keys have been moved as follows to avoid their overlap with the enlarged selection zone 250: the selection zones 220 for numeric keys "1", "2", and "3" have been moved upward; the selection zones 220 for the numeric keys "4" and "6" have been moved left and right, respectively; and the selection zones 220 for keys "7", "8", "9", "*", "0", and "#" have been moved downward. When the selection zone 250 is returned back to its default size (responsive to user deselection thereof), the adjacent selection zones 220 can also be returned to their default locations.

Figure 7:
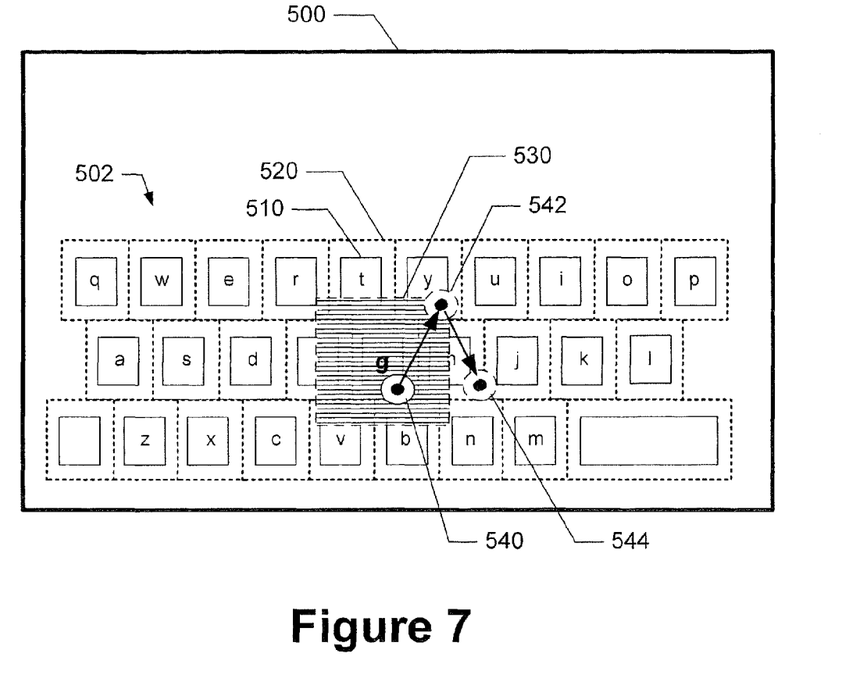
FIG. 7 illustrates an exemplary keyboard that is displayed on a touch sensitive display with each keyboard key having a selection zone that is temporarily enlarged and the selection zones of the adjacent numeric keys are reduced/disabled in response to detection of a user touch point within the selection zone of the selected key (e.g., alphabetic "g" key) in accordance with some embodiments of the present invention.

FIG. 7 illustrates an exemplary qwerty configured keyboard 502 that is displayed on a touch sensitive display device 500 with each keyboard key 510 (e.g., the displayed key symbols with the associated alphabetic indicia) having an associated selection zone 520 (i.e., the dashed boxes enclosing the keys 510). The controller circuit is configured to temporarily enlarge one of the selection zones in response to a user touching a location within that selection zone, and to reduce the size of and/or disable the selection zones associated with one or more adjacent keys 510.

For example, when the user touches a location 540 within the selection zone associated with the "g" key, the controller circuit responds by enlarging the selection zone 530 for the "g" key. The controller circuit may also correspondingly decrease the size of the selection zones 520 associated with at least one of the immediately adjacent keys. For example, the controller circuit may decrease the size of the selection zones 520 associated with the "r", "t", "y", "f", "h", "v", "b", and/or "n" keys so that they are not overlapped by the enlarged selection zone 530 for the "g" key.

When the touch signal indicates that the touch location has then slid to location 542, which is still within the enlarged selection zone 530, and that the user has ceased touching the display device 500, the control circuit responds by outputting an indication of the user's selection of the "g" key.

In contrast, when the touch signal indicates that the touch location has slid from location 540 to location 542 and then to location 544, which is outside the enlarged selection zone 530, the controller circuit responds thereto by increasing the size of the selection zone 520 for the "h" key and decreases the size of the selection zone 530 so that it is not overlapped by the enlarged selection zone for the "h" key and/or it disables the selection zone 530. When the touch signal indicates that the user has ceased touching the display device 500 at location 544 or at another location within the enlarged selection zone for the "h" key, the controller circuit responds thereto by outputting an indication of the user's selection of the "h" key.

FIG. 9 is a block diagram of a wireless communication terminal 700 that includes a touch screen that is configured according to some embodiments of the present invention. Although various embodiments are described in the context of a wireless communication terminal 700, the invention is not limited thereto as it may be embodied in any type of electronic device that includes a touch sensitive display device that is configured to operate in accordance with the least one embodiment of the present invention. For example, the invention may be embodied in game devices, music devices (e.g., MP3 players), laptop computers, and/or other devices that have touch screen display devices.

Referring to FIG. 9, the terminal 700 includes a touch sensitive display device 702, a controller circuit 710, a wireless communications controller 730, a radio transceiver 732, and may include other user interfaces such as a microphone 740, a speaker 742, and a camera 744.

The display device 702 may be any suitable assembly that is configured to display graphical images and to detect user touch selections thereon and to convert the detected touches into positional information that is conveyed through a touch signal for processed by the controller circuit 710. The display 702 may include a touch display panel 704 and a touch coordinate circuit 706 that outputs a position signal that is indicates the coordinate locations of a user object that is touching the touch display panel 704. The touch display panel 704 may, for example, be a liquid crystal display (LCD) with or without auxiliary lighting (e.g., a lighting panel).

The touch display panel 704 may be configured as a resistive touchscreen panel, a capacitive touchscreen panel, a side-optical touchscreen panel, and/or another touch sensitive panel technology. A resistive touchscreen panel can include two spaced-apart thin metallic electrically conductive and resistive layers that connect to conduct electrical current at one or more locations where a user touches the touch display panel 704. This electrical current can be used by the touch coordinate circuit 706 to detect the coordinate locations of the one or more locations where the user is touching the touch display panel 704.

A capacitive touchscreen panel can be coated with a material, such as indium tin oxide, that conducts a continuous electrical current across a sensor to form a controlled field of stored electrons in both X and Y axes. When the capacitance field of the capacitive touchscreen panel is altered by another capacitance field, e.g., a user's finger, the touch coordinate circuit 706 can measure the distortion and identify X and Y axes location(s) of the disturbance.

A side-optical touchscreen panel can include a grid of optical detectors on top of the surface of the touch display panel 704. Light is sent from one side to the other and received by an array of detectors. The beams of light are broken when a finger or stylus is in close proximity such that the location can be translated into X and Y coordinates by the touch coordinate circuit 706.

Although various embodiments are described in the context of the sensing locations of where the user physically touches the touch display panel 704, the invention is not limited thereto. In some other embodiments, the touch display panel 704 may include an array of IR light sources and sensors arranged between various pixel locations on the display surface that can sense the x-y locations of fingers that are closely adjacent to, but not touching, the touch display panel 704. Accordingly, as used herein, the term "touch locations" refers to positions on the screen where fingers or other user controlled objects are physically touching and/or adjacent to the touch display panel 704. The user may therefore cease "touching the display device" by moving the finger/object outside of the detection range of the IR sensors.

The wireless communications controller 730 is configured to communicate data over the radio transceiver 732 according to one or more communication protocols, such as one or more cellular communication protocols and/or other communication protocols. The cellular communication protocols may include, but are not limited to, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and/or Universal Mobile Telecommunications System (UMTS). The other communication protocols may include, but are not limited to, BLUETOOTH, REID, and/or WLAN (e.g., 802.11a, 802.11b, 802.11e, 802.11g, and/or 802.11i).

The controller circuit 710 is configured to carry out the operations explained herein with regard to one or more of FIGS. 2-8. Thus, the controller circuit 710 can execute a display application 712 that defines touch selection zones that are associated with user selectable indicia that are displayed on the touch display panel 704, and can control the size of touch selection zones responsive to the touch signal from the touch coordinate circuit 706. The controller circuit 710 can further include user applications 714 that provide various functionality to users that can receive inputs by the user selection of the touch selection zones that are defined for the displayed indicia. Exemplary user applications 714 may include, but are not limited to, games, personal contact information/schedule organizers, web browsers, and communication functionality.

Figure 8:
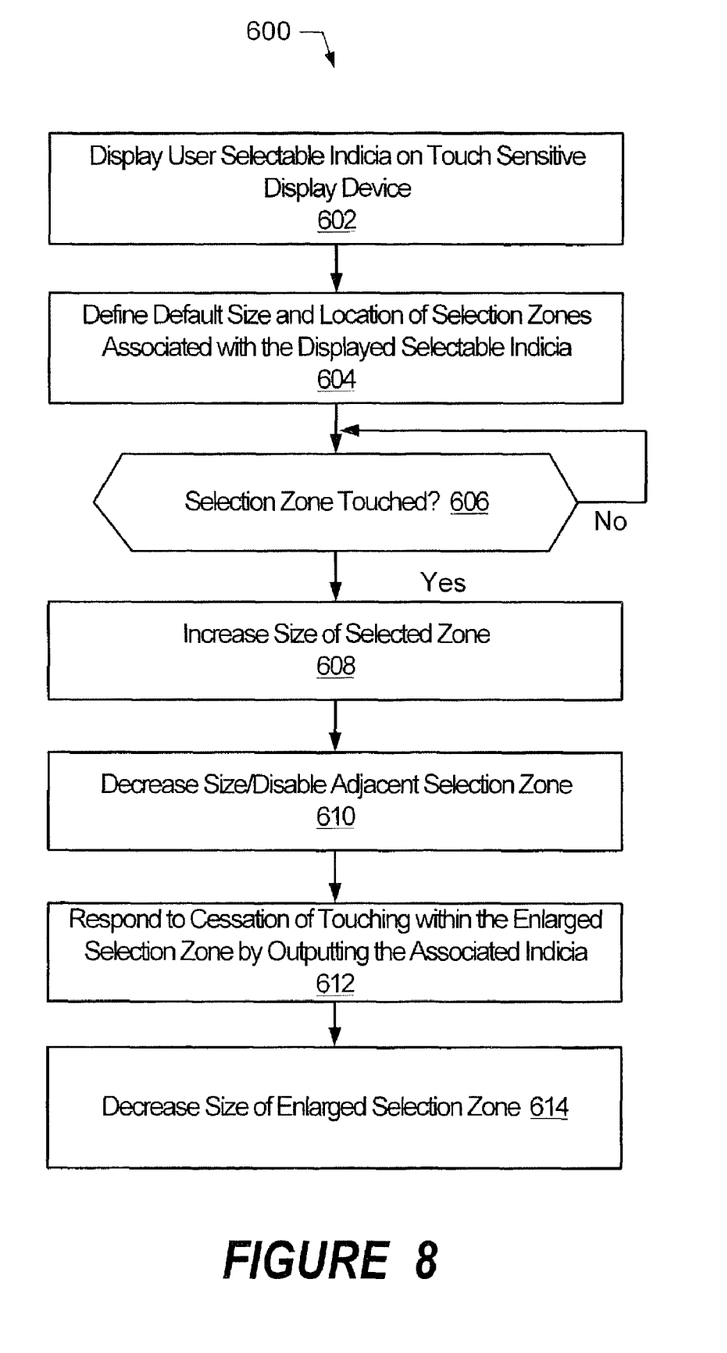
FIG. 8 is a flowchart that illustrated exemplary operations and methods that are carried out by a touch screen device to sense a user's selections among displayed keys and to control corresponding selection zone sizes in accordance with some embodiments of the present invention.

FIG. 8 is a flowchart that illustrates exemplary methods and operations 600 that may be carried out by the controller circuit 710 to sense a user's selections among displayed indicia and to control corresponding selection zone sizes in accordance with some embodiments of the present invention. Referring to FIG. 9, the controller circuit 710 displays user selectable indicia on the touch display panel 704 (Block 602). The controller circuit 710 defines a default size and location of a plurality of selection zones on the display panel 704 that are each associated with different ones of the displayed selectable indicia (Block 604). The controller circuit 710 responds (Block 606) to a touch signal from the display panel 704 that identifies a first touch location of a user object by increasing the size (Block 608) of a first one of the selection zones that includes the first touch location. The controller circuit 710 may also decrease the size of and/or disable (Block 610) one or more adjacent selection zones that may otherwise be overlapped by the enlarged selection zone. The controller circuit 710 responds to the touch signal identifying that the user object has ceased touching the display device at a second touch location (Block 612), which is within the enlarged first selection zone but outside the default sized first selection zone, by outputting a first one of the selectable indicia that is associated with the first selection zone. The controller circuit 710 may then decrease the size of the enlarged selection zone, such as back to the default size, and may correspondingly increase the size of (e.g., back to the default size) and/or enable any adjacent decreased-size touch zones (Block 614).

It is to be understood that the present invention is not limited to the particular configuration shown in FIGS. 2-9, but is intended to encompass any configuration capable of carrying out operations described herein. While particular functionalities are shown in particular blocks by way of illustration, functionalities of different blocks and/or portions thereof may be combined, divided, and/or eliminated. Moreover, the functionality of the hardware/software architecture of FIG. 9 may be implemented as a single processor system or a multi-processor system in accordance with various embodiments of the present invention.

The present invention may be embodied as methods, electronic devices, and/or computer program products. Some embodiments of the present invention were described above with reference to block diagrams and/or operational illustrations of methods and electronic devices. In this regard, each block may represent a module, segment, or portion of code, which comprises one or more executable instructions for implementing the specified logical function(s). It is to be understood that each block of the block diagrams and/or operational illustrations, and combinations of blocks in the block diagrams and/or operational illustrations can be embodied on analog circuitry and/or digital circuitry. These program instructions may be provided to a controller circuit, which may include one or more general purpose processors, special purpose processors, ASICs, and/or other programmable data processing apparatus, such that the instructions, which execute via the controller, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

These computer program instructions may also be stored in a computer-usable or computer-readable memory that may direct a controller circuit to function in a particular manner, such that the instructions stored in the computer usable or computer-readable memory produce an article of manufacture including instructions that implement the function specified in the flowchart and/or block diagram block or blocks. The computer-usable or computer-readable medium may be, for example but not limited to, an electronic, magnetic, optical, electromagnetic, or semiconductor system, apparatus, or device. More specific examples (a nonexhaustive list) of the computer-readable medium include the following: hard disk devices, optical storage devices, magnetic storage devices, random access memory (RAM) devices, read-only memory (ROM) devices, erasable programmable read-only memory (EPROM or Flash memory) devices, and compact disc read-only memory (CD-ROM).

Many different applications/variations will be apparent to a skilled person having knowledge of the present disclosure. In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. An electronic device, comprising:
 a controller circuit that is:
  configured to display selectable indicia on a touch sensitive display device,
  wherein the selectable indicia are arranged in a plurality of adjacent rows, each row including a plurality of displayed selectable indicia with associated selection zones;
  configured to define a default size and location of a plurality of selection zones on the display device that are each associated with different ones of the displayed selectable indicia,
  configured to respond to a touch signal from the display device that identifies a first touch location of a user object by increasing the size of a first one of the selection zones that includes the first touch location, configured to respond to the touch signal identifying that the user object has ceased touching the display device at a second touch location, which is within the enlarged first selection zone but outside the default sized first selection zone, by outputting a first one of the selectable indicia that is associated with the first selection zone, wherein selection of the first selection zone in a row causes other selection zones in the same row to slide along the row away from the enlarged first selection zone so that the enlarged first selection zone does not overlap the selection zones of the adjacent selectable indicia.

2. The electronic device of claim 1, wherein:
the controller circuit is further configured to respond to the touch signal identifying that the user object has ceased touching the display device by decreasing the size of the enlarged first selection zone back to the default size.

3. The electronic device of claim 1, wherein:
the controller circuit is further configured to respond to the touch signal identifying that the user object has slid from the first touch location to a third touch location, where the user object has then ceased touching the display device and where the third touch location is within a third selection zone that is outside of the first selection zone, by outputting a third one of the selectable indicia that is associated with the third selection zone and by decreasing the size of the enlarged first selection zone.

4. The electronic device of claim 1, wherein:
the controller circuit is further configured to respond to the touch signal identifying that the user object has slid from the first touch location to a third location that is outside the enlarged first selection zone by decreasing the size of the enlarged first selection zone and by increasing the size of a second one of the selection zones that includes the third location.

5. The electronic device of claim 1, wherein:
the first and second selection zones are defined by the controller circuit to have the same default size when the touch signal does not indicate that a location within either of the first and second selection zones is being touched.

6. The electronic device of claim 1, wherein:
the controller circuit is further configured to respond to the touch signal identifying that the first touch location is being touched by decreasing the size of all selection zones that are immediately adjacent to the first selection zone so that the enlarged first selection zone does not overlap any of the immediately adjacent selection zones having the decreased sizes.

7. The electronic device of claim 1, wherein:
the controller circuit is further configured to respond to the touch signal identifying that another touch location is being touched that is within the decreased size second selection zone by increasing the size of the second selection zone and decreasing the size of the first selection zone so that enlarged second selection zone does not overlap the first selection zone having the decreased size.

8. The electronic device of claim 1, wherein:
the controller circuit is further configured to respond to the touch signal identifying that the first touch location of the first selection zone is being touched by disabling a second selection zone that is adjacent to the first selection zone so that the enlarged first selection zone at least partially overlaps the disabled second selection zone.

9. The electronic device of claim 8, wherein:
the controller circuit is further configured to respond to the touch signal identifying that the first touch location is being touched by disabling all selection zones that are immediately adjacent to the first selection zone so that the enlarged first selection zone at least partially overlaps the disabled immediately adjacent selection zones.

10. The electronic device of claim 8, wherein:
the controller circuit is further configured to respond to the touch signal identifying that another touch location is being touched that is within the disabled second selection zone by increasing the size of the second selection zone, by enabling the second selection zone, by decreasing the size of the first selection zone, and by disabling the first selection zone so that the enlarged second selection zone at least partially overlaps the disabled first selection zone having the decreased size.

11. The electronic device of claim 1, wherein:
the controller circuit is further configured to display a numeric keypad with spaced apart indicia for each of the integer numbers from 0 to 9, to associate ten selection zones each with a different one of the displayed numbers, and to respond to the touch signal identifying that the first touch location within the first selection zone that is associated with the displayed number 5 by enlarging the size of the first selection zone and by decreasing the size of an adjacent second selection zone that is associated with one of the displayed numbers 2, 4, 6, and 8.

12. The electronic device of claim 11, wherein:
the controller circuit is further configured to respond to the touch signal identifying that the user object has slid from the first touch location to the second touch location, where the user object has then ceased touching the display device, by outputting an indication of the user's selection of the number 5.

13. The electronic device of claim 12, wherein:
the controller circuit is further configured to respond to the touch signal identifying that the user object has slid from the first touch location to a third touch location, where the user object then ceased touching the display device and where the third touch location is within a third selection zone that is outside of the first selection zone and that is associated with the displayed number 4, by outputting an indication of the user's selection of the number 4 and by decreasing the size of the enlarged first selection zone associated with the displayed number 5.

14. The electronic device of claim 1, wherein:
the controller circuit is further configured to display a qwerty alphabetic keyboard with spaced apart indicia for each letter of the keyboard, to associate selection zones each with a different one of the displayed letters, and to respond to the touch signal from the display device identifying that the user object has touched the first touch location within the first selection zone for a first one of the letters by enlarging the first selection zone and by decreasing the size of the selection zone associated with at least one of the displayed letters that is immediately adjacent to the first one of the letters, and to respond to the touch signal identifying that the user object has ceased touching the display device at the second touch location, which is within the enlarged first selection zone, by outputting the first letter.

15. The electronic device of claim 14, wherein:
the controller circuit is further configured to respond to the touch signal identifying that the user object has slid from the first touch location to the third touch location, where the user object then ceased touching the display device and where the third touch location is within the third selection zone that is outside of the first selection zone and that is associated with a second one of the letters, by outputting an indication of the user's selection of the second letter and by decreasing the size of the enlarged first selection zone associated with the first letter.

16. The electronic device of claim 1, wherein:
the controller circuit is further configured to respond to the touch signal identifying that the first touch location of the first selection zone is being touched by changing the shape of adjacent selection zones so that the enlarged first selection zone does not overlap the adjacent selection zones having the changed shape.

17. The electronic device of claim 1, wherein:
the controller circuit is further configured to respond to the touch signal identifying that the first touch location of the first selection zone is being touched by moving locations of the adjacent selection zones so that the enlarged first selection zone does not overlap the relocated adjacent selection zones,
wherein the displayed selectable indicia associated with each of the selection zones shifts along the same row with movement of the locations of the adjacent selection zones.

18. The electronic device of claim 1, wherein:
the controller circuit is further configured to respond to selection of the first selection zone by sliding adjacent rows of the selection zones away from the row containing the first selection zone so that the enlarged first selection zone does not overlap the selection zones in the adjacent rows.

19. An electronic device, comprising:
a touch-sensitive display device that is configured to generate a touch signal that identifies a touch location of a user object on a screen of the display device; and
a controller circuit that is:
  configured to display selectable indicia on the display device,
  wherein the selectable indicia are arranged in a plurality of adjacent rows, each row including a plurality of displayed selectable indicia with associated selection zones;
  configured to define a default size and location of a plurality of selection zones on the display device that are each associated with different ones of the displayed selectable indicia,
  configured to respond to a touch signal from the display device that identifies a first touch location of a user object by increasing the size of a first one of the selection zones that includes the first touch location,
  configured to respond to the touch signal identifying that the user object has ceased touching the display device at a second touch location, which is within the enlarged first selection zone but outside the default sized first selection zone, by outputting a first one of the selectable indicia that is associated with the first selection zone,
  configured to respond to the touch signal identifying that the user object has slid from the first touch location to a third location that is outside the enlarged first selection zone by decreasing the size of the enlarged first selection zone and by increasing the size of a second one of the selection zones that includes the third location,
  configured to respond to the touch signal identifying that the user object has then ceased touching the display device at the third touch location by outputting a third one of the selectable indicia that is associated with the third selection zone and by decreasing the size of the enlarged first selection zone,
  wherein selection of the first selection zone in a row causes other selection zones in the same row to slide along the row away from the enlarged first selection zone so that the enlarged first selection zone does not overlap the selection zones of the adjacent selectable indicia.

20. The electronic device of claim 19, wherein:
the controller circuit is further configured to respond to selection of the first selection zone by sliding adjacent rows of the selection zones away from the row containing the first selection zone so that the enlarged first selection zone does not overlap the selection zones in the adjacent rows.

\* \* \* \* \*

UNITED STATES PATENT AND TRADEMARK OFFICE
CERTIFICATE OF CORRECTION

PATENT NO. : 8,381,118 B2
APPLICATION NO. : 12/573552
DATED : February 19, 2013
INVENTOR(S) : Minton It is certified that error appears in the above-identified patent and that said Letters Patent is hereby corrected as shown below:

In the Specification:
Column 11, Line 13:
    Please replace "BLUETOOTH, REID," to read -- BLUETOOTH, RFID, --

Signed and Sealed this
Fourth Day of June, 2013

Teresa Stanek Rea
*Acting Director of the United States Patent and Trademark Office*